US012449757B2

(12) United States Patent
Nakamura

(10) Patent No.: US 12,449,757 B2
(45) Date of Patent: Oct. 21, 2025

(54) IMAGE FORMING APPARATUS HAVING OPENING- AND-CLOSING COVER WITH ROTATION SHAFT ROTATABLE WITH LOCK LEVERS

(71) Applicant: Mitsutaka Nakamura, Kanagawa (JP)

(72) Inventor: Mitsutaka Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/590,036

(22) Filed: Feb. 28, 2024

(65) Prior Publication Data

US 2024/0302787 A1 Sep. 12, 2024

(30) Foreign Application Priority Data

Mar. 10, 2023 (JP) ................................ 2023-037269

(51) Int. Cl.
*G03G 15/00* (2006.01)
*G03G 21/16* (2006.01)

(52) U.S. Cl.
CPC . *G03G 21/1633* (2013.01); *G03G 2221/1642* (2013.01)

(58) Field of Classification Search
CPC ....................... G03G 21/1623; G03G 21/1633
See application file for complete search history.

(56) References Cited

U.S. PATENT DOCUMENTS 5,802,426 A * 9/1998 Miyazaki ........... G03G 15/2064 399/113
2014/0233979 A1 8/2014 Namba et al.
2015/0205252 A1 7/2015 Namba et al.

FOREIGN PATENT DOCUMENTS

JP 2004-104008 A 4/2004
JP 2011-158624 A 8/2011
JP 2021-081571 A 5/2021

* cited by examiner

*Primary Examiner* — Hoang X Ngo
(74) *Attorney, Agent, or Firm* — Harness, Dickey & Pierce, P.L.C.

(57) ABSTRACT

An image forming apparatus includes an opening-and-closing cover that is rotatable around a support shaft with respect to a body of the image forming apparatus. The opening-and-closing cover receives pressure in an opening direction from the body of the image forming apparatus when the opening-and-closing cover is closed and includes a rotation shaft rotatably held, a lock lever, and a pair of holding portions. The lock lever is rotatably disposed on the rotation shaft, is to be locked to or unlocked from a locking portion of the body of the image forming apparatus in conjunction with rotation of the rotation shaft, and includes a pair of held portions at both ends of the lock lever. The pair of holding portions are disposed to sandwich the lock lever from both sides of the lock lever in an axial direction of the rotation shaft and hold the pair of held portions.

12 Claims, 5 Drawing Sheets

IMAGE FORMING APPARATUS HAVING OPENING- AND-CLOSING COVER WITH ROTATION SHAFT ROTATABLE WITH LOCK LEVERS

CROSS-REFERENCE TO RELATED APPLICATION

This patent application is based on and claims priority pursuant to 35 U.S.C. § 119 (a) to Japanese Patent Application No. 2023-037269, filed on Mar. 10, 2023, in the Japan Patent Office, the entire disclosure of which is hereby incorporated by reference herein.

BACKGROUND

Technical Field

Embodiments of the present disclosure relate to an image forming apparatus such as a copying machine, a printer, a facsimile machine, or a multifunction peripheral thereof or a printing machine.

Related Art

Image forming apparatuses such as copiers and printers are widely known in which an opening-and-closing cover that can open the inside of a body of an image forming apparatus. Specifically, a lateral panel (the opening-and-closing cover) that rotatably holds a transfer roller (a secondary transfer roller) is disposed to be rotatable around a support shaft with respect to the body of the image forming apparatus.

SUMMARY

In an embodiment of the present disclosure, there is provided an image forming apparatus that includes an opening-and-closing cover that is rotatable around a support shaft with respect to a body of the image forming apparatus. The opening-and-closing cover receives pressure in an opening direction from the body of the image forming apparatus when the opening-and-closing cover is closed and includes a rotation shaft rotatably held, a lock lever, and a pair of holding portions. The lock lever is rotatably disposed on the rotation shaft, is to be locked to or unlocked from a locking portion of the body of the image forming apparatus in conjunction with rotation of the rotation shaft, and includes a pair of held portions at both ends of the lock lever in an axial direction of the rotation shaft. The pair of holding portions are disposed to sandwich the lock lever from both sides of the lock lever in the axial direction of the rotation shaft and hold the pair of held portions.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
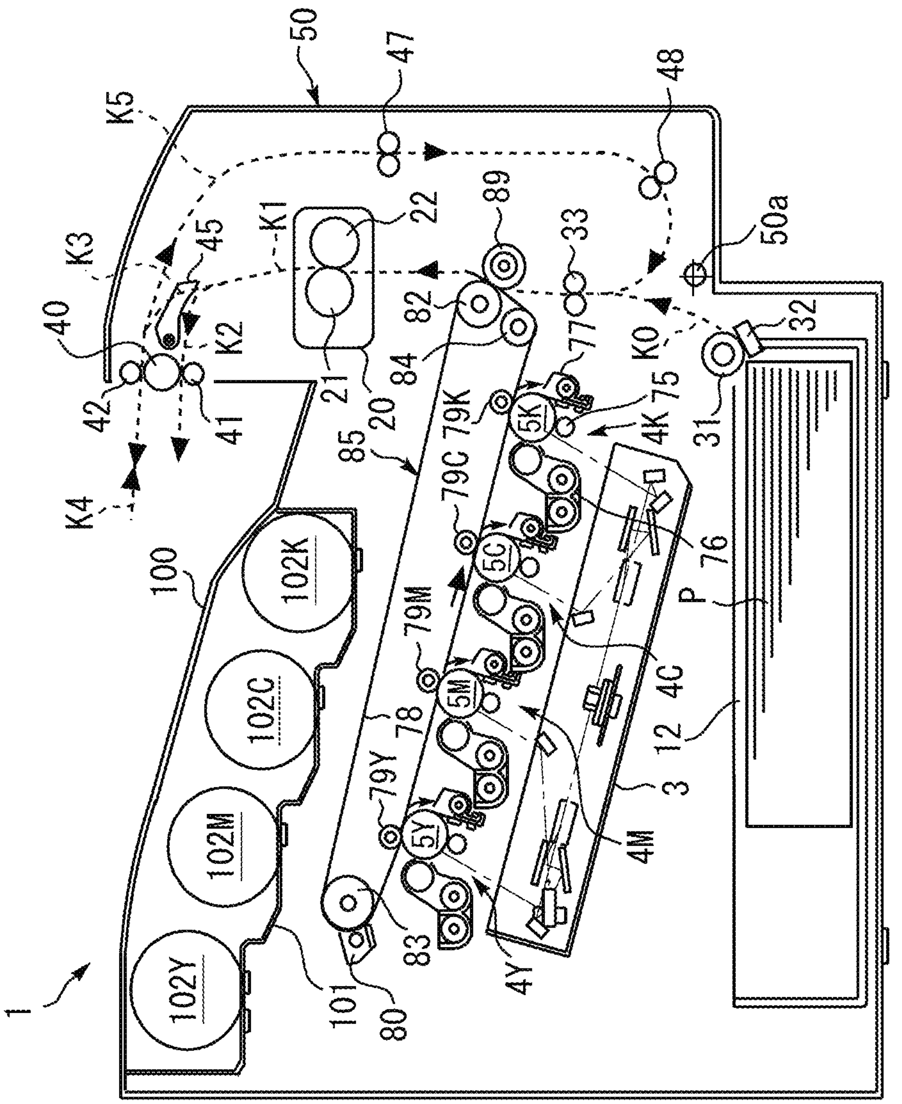
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms “a,” “an,” and “the” are intended to include the plural forms as well, unless the context clearly indicates otherwise.

First, with reference to FIG. 1, a description is given of an overall configuration and operation of an image forming apparatus 1, according to an embodiment of the present disclosure. As illustrated in FIG. 1, the image forming apparatus 1 according to the present embodiment is a tandem-type color printer. Four toner bottles 102Y, 102M, 102C, and 102K corresponding to respective colors (yellow, magenta, cyan, and black) are detachably (replaceably) attached to a bottle housing 101 located above a body of the image forming apparatus 1. An intermediate transfer unit 85 is disposed below the bottle housing 101. Image forming devices 4Y, 4M, 4C, and 4K corresponding to the respective colors (yellow, magenta, cyan, and black) are arranged in parallel to face an intermediate transfer belt 78 (an intermediate transferor) of the intermediate transfer unit 85. The image forming apparatus 1 includes a sheet feeder 12 (a sheet tray) in a lower portion of the body of the image forming apparatus 1. The sheet feeder 12 stores a stack of multiple sheets P such as sheets of paper stacked on one on another. A double-sided conveying unit is disposed on the right side of the body of the image forming apparatus 1 for conveying (ejecting) the sheet P toward a stacking section 100 and inverting (switching back) the sheet P to convey the sheet P along a double-sided conveyance path K5. For example, a part of the double-sided conveying unit, and a secondary transfer roller 89 to be described below are disposed on an opening-and-closing cover 50 that is openable and closable.

The image forming devices 4Y, 4M, 4C, and 4K include photoconductor drums 5Y, 5M, 5C, and 5K, respectively. Each of the photoconductor drums 5Y, 5M, 5C, and 5K is surrounded by, for example, a charger 75, a developing device 76, a cleaner 77, and a charge removing device. Image forming processes including a charging process, an exposure process, a developing process, a primary transfer process, and a cleaning process are performed on each of the photoconductor drums 5Y, 5M, 5C, and 5K to form yellow, magenta, cyan, and black toner images on the photoconductor drums 5Y, 5M, 5C, and 5K, respectively.

main motor drives to rotate the photoconductor drums 5Y, 5M, 5C, and 5K clockwise in FIG. 1. The charger 75 disposed opposite each of the photoconductor drums 5Y, 5M, 5C, and 5K uniformly charges the outer circumferential surface thereof (a charging process). After the charging process, the charged outer circumferential surface of each of the photoconductor drums 5Y, 5M, 5C, and 5K reaches an irradiation position at which an exposure device 3 (in other words, a writing device) irradiates and scans the photoconductor drums 5Y, 5M, 5C, and 5K with laser beams, irradiating and scanning the photoconductor drums 5Y, 5M, 5C, and 5K with the laser beams L forms electrostatic latent images according to yellow, magenta, cyan, and black image data (an exposure process).

After the exposure process, the irradiated and scanned outer circumferential surface of each of the photoconductor drums 5Y, 5M, 5C, and 5K reaches a developing position at which the developing device 76 is disposed opposite each of the photoconductor drums 5Y, 5M, 5C, and 5K, and the developing device 76 develops the electrostatic latent image formed on the respective photoconductor drums 5Y, 5M, 5C, and 5K, thus forming yellow, magenta, cyan, and black toner images on the photoconductor drums 5Y, 5M, 5C, and 5K (a developing process). After the developing process, the yellow, magenta, cyan, and black toner images formed on the photoconductor drums 5Y, 5M, 5C, and 5K reach primary transfer nips formed between the photoconductor drums 5Y, 5M, 5C, and 5K and the intermediate transfer belt 78 by four primary transfer bias rollers 79Y, 79M, 79C, and 79K pressed against the four photoconductor drums 5Y, 5M, 5C, and 5K via the intermediate transfer belt 78, respectively, and the yellow, magenta, cyan, and black toner images are primarily transferred onto the intermediate transfer belt 78 (a primary transfer process). After the primary transfer process, residual toner (untransferred toner) onto the intermediate transfer belt 78 remains on the photoconductor drums 5Y, 5M, 5C, and 5K slightly.

After the primary transfer process, the residual toner (untransferred toner) on each of the photoconductor drums 5Y, 5M, 5C, and 5K reaches a cleaning position at which the cleaner 77 is disposed opposite each of the photoconductor drums 5Y, 5M, 5C, and 5K, and a cleaning blade of the cleaner 77 mechanically collects the residual toner from each of the photoconductor drums 5Y, 5M, 5C, and 5K (a cleaning process). Finally, the cleaned outer circumferential surface of each of the photoconductor drums 5Y, 5M, 5C, and 5K reaches a charge removal position at which the charge removing device is disposed opposite a corresponding one of the photoconductor drums 5Y, 5M, 5C, and 5K, and the charge removing device eliminates residual potential from each of the photoconductor drums 5Y, 5M, 5C, and 5K. Thus, a series of image forming processes performed on the photoconductor drums 5Y, 5M, 5C, and 5K is finished.

The yellow, magenta, cyan, and black toner images formed on the photoconductor drums 5Y, 5M, 5C, and 5K in the developing process are primarily transferred onto an outer circumferential surface of the intermediate transfer belt 78 such that the yellow, magenta, cyan, and black toner images are superimposed on the intermediate transfer belt 78. Thus, a color toner image is formed on the surface of the intermediate transfer belt 78. The intermediate transfer unit 85 includes the intermediate transfer belt 78 as an intermediate transferor, the four primary transfer bias rollers 79Y, 79M, 79C, and 79K, a secondary-transfer backup roller 82, a cleaning backup roller 83, a tension roller 84, and an intermediate transfer cleaner 80. The intermediate transfer belt 78 is extended and supported by the three rollers, that is, the secondary-transfer backup roller 82, the cleaning backup roller 83, and the tension roller 14. One of the three rollers, that is, the secondary-transfer backup roller 82 is coupled to the main motor to drive and rotate the intermediate transfer belt 78 in a rotation direction indicated by an arrow in FIG. 1.

The four primary transfer bias rollers 79Y, 79M, 79C, and 79K are pressed against the corresponding photoconductor drums 5Y, 5M, 5C, and 5K, respectively, via the intermediate transfer belt 78 to form primary transfer nips. Each of the primary transfer bias rollers 79Y, 79M, 79C, and 79K is applied with a primary transfer bias having a polarity opposite a polarity of electric charge of toner. The intermediate transfer belt 78 moves in the direction indicated by the arrow in FIG. 1 and sequentially passes through the primary transfer nips of the primary transfer bias rollers 79Y, 79M, 79C, and 79K. Thus, the toner images formed on the respective photoconductor drums 5Y, 5M, 5C, and 5K are primarily transferred onto the intermediate transfer belt 78 while being superimposed one atop another to form a composite color toner image on the intermediate transfer belt 78 (a primary transfer process).

Subsequently, the intermediate transfer belt 78 to which the superimposed toner images of yellow, magenta, cyan, and black have been transferred reaches a position opposite (facing) the secondary transfer roller 89 as a developing device. At this position, the secondary-transfer backup roller 82 and the secondary transfer roller 89 nip the intermediate transfer belt 78 therebetween to form a secondary transfer nip. Specifically, the secondary transfer roller 89 contacts the secondary-transfer backup roller 82 via the intermediate transfer belt 78 at a specified pressure (contact pressure). The toner images of four colors formed on the intermediate transfer belt 78 are transferred onto the sheet P conveyed to the position of the secondary transfer nip (a secondary transfer process). At this time, untransferred toner that is not transferred onto the sheet P remains on the surface of the intermediate transfer belt 78. The surface of the intermediate transfer belt 78 then reaches a position opposite the intermediate transfer cleaner 80. At this position, the intermediate transfer cleaner 80 collects the untransferred toner from the intermediate transfer belt 78. Thus, a series of transfer processes performed on the intermediate transfer belt 78 is completed.

The sheet P is conveyed from the sheet feeder 12 disposed in the lower portion of the body of the image forming apparatus 1 to the secondary transfer nip via a first conveyance path K0 and a second conveyance path K1. Specifically, the sheet feeder 12 contains a stack of multiple sheets P such as sheets of paper stacked on one on another. As a sheet feed roller 31 is rotated counterclockwise in FIG. 1, the uppermost sheet P nipped between the sheet feed roller 31 and a friction pad 32 is fed toward between the rollers of a registration roller pair 33 (timing roller pair) while the sheet P is guided by the guide plates forming a first conveyance path K0 and a second conveyance path K1.

The sheet P conveyed to the registration roller pair 33 serving as a timing roller pair temporarily stops at a position of a roller nip (nip portion) of the registration roller pair 33 that stops rotating. The registration roller pair 33 is rotated to convey the sheet P toward the secondary transfer nip (image forming section), timed to coincide with the color toner image on the intermediate transfer belt 78. Thus, the desired color toner image is transferred onto the sheet P.

Thereafter, the sheet P, on which the color image has been transferred at the secondary transfer nip (image forming section), is conveyed to a fixing device 20 via the second conveyance path K1. In the fixing device 20, a fixing belt 21 and a pressure roller 22 apply heat and pressure to the sheet P at a fixing nip formed by the fixing belt 21 and the pressure roller 22 pressing each other to fix the color toner image on the sheet P (a fixing process).

The sheet P after the fixing process passes through the second conveyance path K1, is guided to an ejection conveyance path K2 by a switching member 45 (branching claw), and is ejected to the outside of the apparatus by a first roller 40 and a second roller 41 serving as an ejection roller pair. The sheets P ejected to the outside of the apparatus by the first roller 40 and the second roller 41 are sequentially stacked as output images on the stacking section 100. Thus, a series of image forming processes (printing operation) in the image forming apparatus 1 is completed.

The above-described operations of the image forming apparatus 1 and movement of the sheet P from the sheet feeder 12 to the stacking section 100 are performed when a single-sided print mode is selected. In the single-sided print mode, the image is formed only on the front face of the sheet P. In the single-sided print mode (and at an end of the double-sided print mode, that is, when the sheet P is ejected to the stacking section 100 after the images are printed on both sides of the sheet P), the switching member 45 is at a position (the position illustrated in FIG. 1) after the switching member 45 rotates counterclockwise about the rotation shaft to open the ejection conveyance path K2 and close a relay conveyance path K3.

Figure 3:
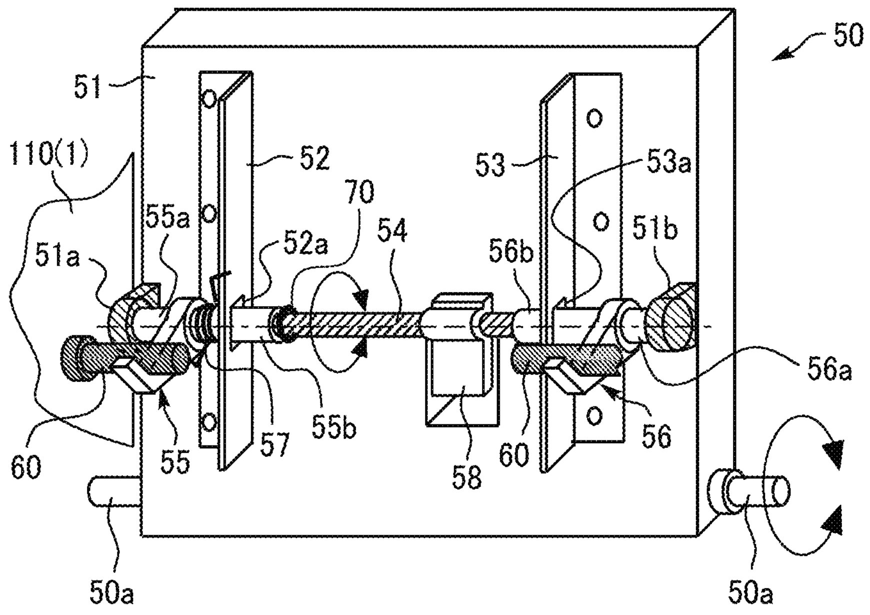
FIG. 3 is a perspective view of the opening-and-closing cover of FIGS. 2A and 2B viewed from the inside of a body of the image forming apparatus, according to an embodiment of the present disclosure.

When a double-sided print mode (a mode in which images are formed on the front face and the back face of the sheet P) is selected, the image forming apparatus 1 operates as follows, and the sheet P moves as follows. The processes until the sheet P fed from the sheet feeder 12 reaches the fixing device 20 via the first conveyance path K0, the second conveyance path K1, and the secondary transfer nip are substantially same as the processes in the single-sided print mode. The sheet P after the fixing process (with an image formed on the front surface) is guided by the switching member 45 to a switchback conveyance path K4 via the relay conveyance path K3. At this time, the switching member 45 rotates clockwise around the rotation shaft to close the ejection conveyance path K2 and open the relay conveyance path K3, and then stops at the position. In the switchback conveyance path K4, a reverse roller 42 and the first roller 40 temporarily stops rotating when the trailing end (the trailing end in a sheet conveyance direction) of the sheet P reaches the nip of the reverse roller 42 and the first roller 40 (when the trailing end of the sheet P passes through the branching point between the relay conveyance path K3 and the double-sided conveyance path K5). At this time, the trailing end of the sheet P having a fixed image on the front face is held by the reverse roller 42, and the leading end of the sheet P is exposed outside the image forming apparatus 1 and above the stacking section 100. Subsequently, rotating the reverse roller 42 in reverse reverses the conveyance direction of the sheet P and conveys the sheet P toward the double-sided conveyance path K5. At this time, the switching member 45 rotates counterclockwise around the rotation shaft and stops at the position to close the relay conveyance path K3 and open the ejection conveyance path K2 and the double-sided conveyance path K5 as illustrated in FIGS. 1 and 3.

Thereafter, with reference to FIG. 1, the sheet P guided to the double-sided conveyance path K5 is conveyed by a plurality of conveying roller pairs 47 and 48 disposed in the double-sided conveyance path K5 and guided to the secondary transfer nip. At the secondary transfer nip, an image is secondarily transferred to the back face of the sheet P similar to the secondary transfer process for the front face of the sheet P, and then the sheet P is conveyed toward the fixing device 20 and the fixing process for the back face is performed. As described above, after the fixing process (that is, after the images are printed on both sides of the sheet P), the sheet P is guided to the nip formed by the first roller 40 and the second roller 41 via the ejection conveyance path K2, and then the first roller 40 and the second roller 41 eject the sheet P to the outside the image forming apparatus 1. As a result, the sheets P are sequentially stacked on the stacking section 100.

Figure 2A:
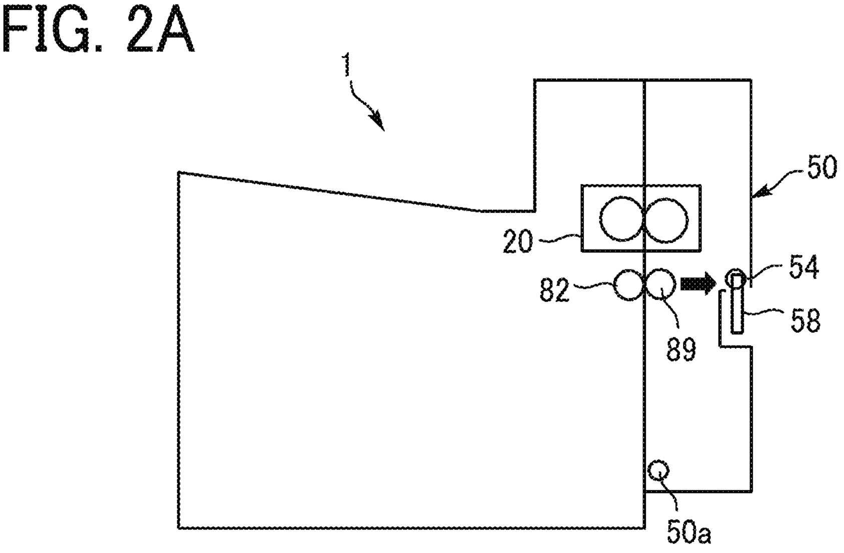
FIGS. 2A and 2B are diagrams illustrating an operation of opening an opening-and-closing cover of the image forming apparatus of FIG. 1, according to an embodiment of the present disclosure.
Figure 2B:
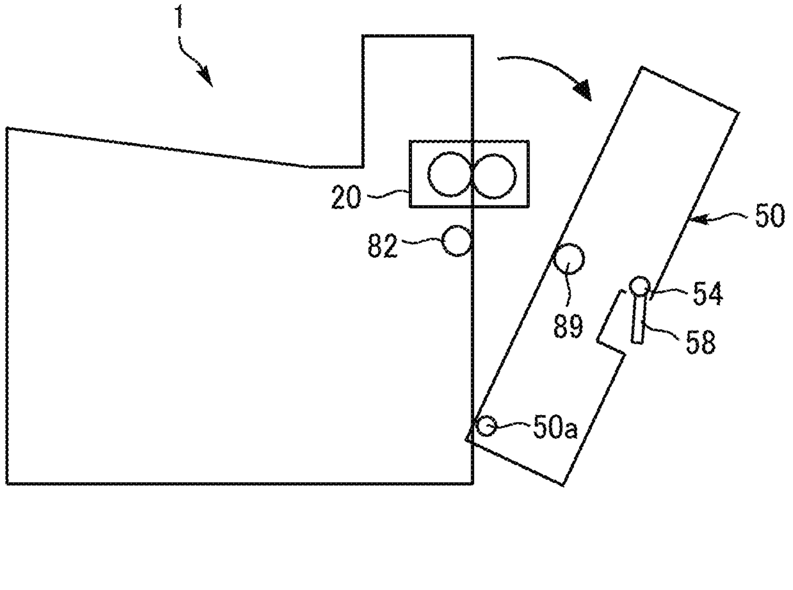

With reference to FIGS. 2 to 8, a description is given of a configuration and operation of the image forming apparatus 1 according to the present embodiment in detail. As illustrated in FIG. 2, the image forming apparatus 1 according to the present embodiment includes the opening-and-closing cover 50 that is rotatable around a support shaft **50*a* relative to the body of the image forming apparatus 1. The opening-and-closing cover 50 is for opening and closing the inside of the body of the image forming apparatus 1. Specifically, when the opening-and-closing cover 50 in a closed state as illustrated in FIG. 2A (and FIG. 1) is rotated clockwise (in the direction indicated by the arrow in FIG. 2B) around the support shaft 50*a* as illustrated in FIG. 2B. A part of the inside of the body of image forming apparatus 1 (for example, the intermediate transfer unit 85, the first conveyance path K0 and the second conveyance path K1, and the fixing device 20) is opened (exposed), so that the sheet P jammed in the first conveyance path K0 and the second conveyance path K1 can be removed, and attachment and detachment of the intermediate transfer unit 85 and the fixing device 20 for maintenance can be performed. When the opening-and-closing cover 50 in an open state as illustrated in FIG. 2B is rotated in the counterclockwise direction in FIG. 2B around the support shaft 50*a*, the opening-and-closing cover 50 turns to the closed state as illustrated in FIG. 2A. Thus, the printing operation described above with reference to FIG. 1 is enabled. The opening-and-closing cover 50 according to the present embodiment is disposed on the back side of the image forming apparatus 1, which is a side opposite the operation side (front side) on which a user sets the sheet P in the sheet feeder 12 and takes out the printed sheet P from the stacking section 100**), and functions as a back cover.

Figure 5:
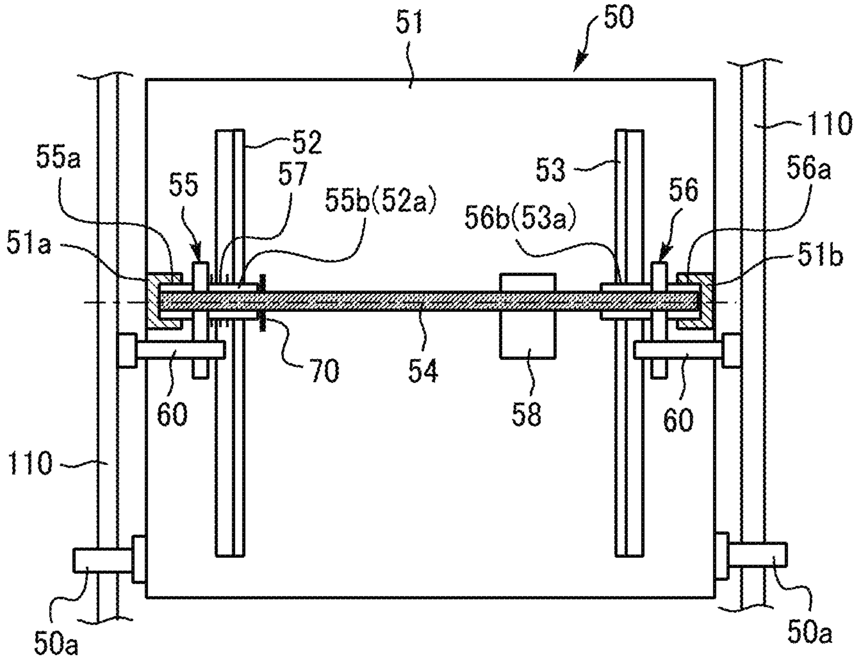
FIG. 5 is a cross-sectional view of the opening-and-closing cover of FIG. 3, according to an embodiment of the present disclosure.

In particular, the opening-and-closing cover 50 according to the present embodiment receives a pressure in an opening direction from the body of the image forming apparatus 1 when the opening-and-closing cover 50 is closed (in the state illustrated in FIGS. 1 and 2A). Specifically, the secondary transfer roller 89 contacts (presses) the secondary-transfer backup roller 82 via the intermediate transfer belt 78 with a relatively large pressure (contact pressure). With reference to FIG. 2, the opening-and-closing cover 50 rotatably holds the secondary transfer roller 89 (a roller for secondarily transferring a toner image formed on the intermediate transfer belt 78 serving as an intermediate transferor onto the sheet P). Accordingly, the above-described pressure (contact pressure) is a pressure (pressure in a direction indicated by the black arrow in FIG. 2A) that the secondary transfer roller 89 receives from the body of the image forming apparatus 1 when the opening-and-closing cover 50 is closed. Such a relation of applying and receiving the pressure similarly occurs even in a case where the secondary transfer roller 89 is disposed in the opening-and-closing cover 50 to be swingable to some extent in the pressure direction. In FIGS. 3 and 5, the secondary transfer roller 89 is not illustrated in the opening-and-closing cover 50 to facilitate understanding of a configuration other than the secondary transfer roller 89.

With reference to FIGS. 3 and 5, in the present embodiment, a structure body (a housing) of the opening-and-closing cover 50 includes a cover body 51, and metal stays 52 and 53. The opening-and-closing cover 50 includes a rotation shaft 54, lock levers 55 and 56, an operation lever 58, a pair of holding portions (bag-shaped holes 51*a* and 51*b* and through holes 52*a* and 53*a*). The cover body 51 is made of a resin material and functions as a main portion of the structure of the opening-and-closing cover 50, and also functions as an exterior of the image forming apparatus 1 (the opening-and-closing cover 50). The metal stays 52 and 53 are substantially L-shaped plates formed to extend in the vertical direction in FIGS. 3 and 5. One surface of each of the metal stays 52 and 53 that forms the L shape is fixed to the cover body 51 by, for example, screwing. The other surface of each of the metal stays 52 and 53 is erected to be parallel to a body side plate 110. The metal stays 52 and 53 are disposed at both ends of the cover body 51 in the axial direction (both ends in a left-and-right direction in FIGS. 3 and 5) of the rotation shaft 54. The metal stays 52 and 53 also have functions of enhancing the mechanical strength of the opening-and-closing cover 50.

With reference to FIGS. 3 and 5, the rotation shaft 54 is rotatably held by the opening-and-closing cover 50 via lock levers 55 and 56. With reference to FIGS. 3, 5, 6A, and 6B, the lock levers 55 and 56 are disposed on the rotation shaft 54 to be rotatable together with the rotation shaft 54. Specifically, the rotation shaft 54 has D-shaped cut portions formed at both ends in an axial direction thereof, and the D cut portions are fitted with D-shaped holes of the lock levers 55 and 56 (refer to FIGS. 6A and 6B).

Figure 6A:
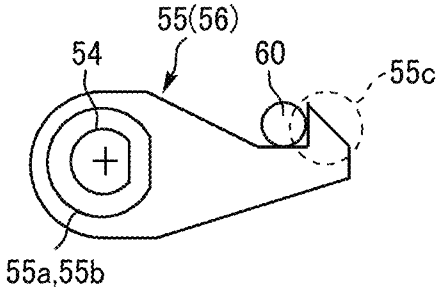
FIGS. 6A and 6B are side views of a lock lever according to an embodiment of the present disclosure.
Figure 6B:
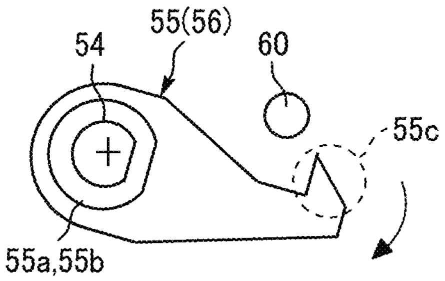

The lock levers 55 and 56 are fitted with and detached from locking pins 60 serving as locking portions of the body of the image forming apparatus 1 in conjunction with the rotation of the rotation shaft 54 in either the forward or reverse direction. Specifically, when the lock lever 55 (or 56) rotates together with the rotation shaft 54 in a direction (forward direction) indicated by the arrow in FIG. 6B from a state where a hook 55*c* formed at the tip of the lock lever 55 is fitted with and locked by the locking pin 60 as illustrated in FIG. 6A (and FIG. 3), the fitting (locking) of the lock lever 55 (hook 55*c*) and the locking pin 60 is released. Thus, the rotation of the opening-and-closing cover 50 in the opening direction (the direction indicated by the arrow of FIG. 2B) is enabled. On the other hand, when the lock lever 55 rotates together with the rotation shaft 54 in a reverse direction (the direction opposite the direction indicated by the arrow in FIG. 6B) from a state where the fitting (locking) of the lock lever 55 (the hook 55*c*) and the locking pin 60 is released as illustrated in FIG. 6B, the fitting (locking) of the lock lever 55 (hook 55*c*) and the locking pin 60 is performed. Thus, the rotation of the opening-and-closing cover 50 in the opening direction (the direction indicated by the arrow of FIG. 2B) is restricted.

As illustrated in FIGS. 3 and 5, the pair of holding portions (bag-shaped holes 51*a* and 51*b* and through holes 52*a* and 53*a*) disposed in the opening-and-closing cover 50 are disposed to sandwich the lock lever 55 (56) from both sides in the axial direction of the rotation shaft 54. The pair of holding portions (bag-shaped holes 51*a* and 51*b* and through holes 52*a* and 53*a*) hold an outer boss 55*a* (56*a*) and an inner boss 55*b* (56*b*) as held portions formed at both ends of the lock lever 55 (56) in the axial direction.

Figure 4A:
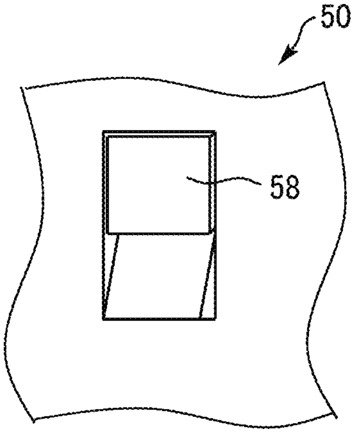
FIGS. 4A and 4B are perspective views of an operation lever viewed from the outside of the body of the image forming apparatus of FIG. 1, according to an embodiment of the present disclosure.
Figure 4B:
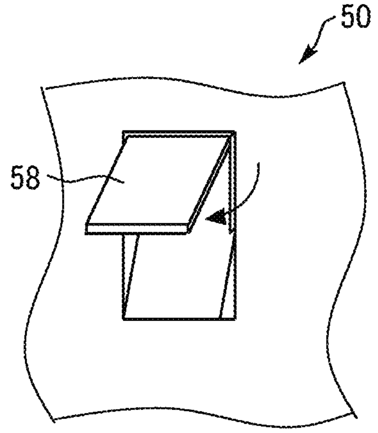

With reference to FIGS. 2 to 4, the operation lever 58 is rotatable together with the rotation shaft 54 and the two lock levers 55 and 56, and is a member operable by an operator such as a user. Specifically, the operation lever 58 is formed with a D-shaped hole at its rotation center, and the D-shaped hole is fitted with a D-shaped cut portion formed at an end of the rotation shaft 54 in the axial direction. A part of the operation lever 58 is exposed on the outer side (the side operated by the operator, or the exterior surface side) of the opening-and-closing cover 50, and the operator holds and operates the exposed portion. As illustrated in FIG. 4A, when the operation lever 58 is not protruding from the exterior surface of the opening-and-closing cover 50, as illustrated in FIG. 6A (and FIG. 3), the hook 55*c* formed at a tip of the lock lever 55 (56) is fitted with the locking pin 60 to be locked. From such a state, an operator inserts a hand into a recess portion provided under the operation lever 58 and rotates the operation lever 58 in the direction indicated by the arrow of FIG. 4B, so that the fitting of the lock lever 55 and the locking pin 60 is released as illustrated in FIG. 6B. Thus, the rotation of the opening-and-closing cover 50 in the opening direction is enabled. A force that biases the operation lever 58 (and the rotation shaft 54 and the lock levers 55 and 56) from the state of FIG. 4B to the state of FIG. 4A is applies to the operation lever 58 by a torsion spring 57 (see FIGS. 3 and 5) as a biasing member described below. Accordingly, when an operator releases his (or her) hand from the operation lever 58 in the state of FIG. 4B, the operation lever 58 automatically returns to the state of FIG. 4A. As illustrated in FIG. 6A, the lock levers 55 and 56 are maintained to be locked by the locking pins 60.

On the other hand, the body of the image forming apparatus 1 includes the locking pins 60 as locking portions. As described above with reference to FIGS. 6A and 6B, the locking pins 60 serving as locking portions restrict the rotation of the lock levers 55 and 56. In the present embodiment, as illustrated in FIG. 5, the body of the image forming apparatus 1 includes two body side plates 110 to sandwich the opening-and-closing cover 50 from both sides in the axial direction of the rotation shaft 54. The body side plates 110 include the locking pins 60 that protrude toward the opening-and-closing cover 50.

As illustrated in FIGS. 3 and 5, the opening-and-closing cover 50 according to the present embodiment includes the two lock levers 55 and 56 made of a resin material. Accordingly, the above-described pair of holding portions are disposed to the two lock levers 55 and 56. The bag-shaped holes 51*a* and 51*b* serving as one holding portion of the pair of holding portions are united with the cover body 51 (molded integrally by injection molding). The bag-shaped holes 51*a* and 51*b* (one holding portion) are arranged on the outer sides in the axial direction of the rotation shaft 54 with respect to the through holes 52*a* and 53*a* (formed to penetrate in the axial direction in the metal stays 52 and 53) as the other holding portion via the lock levers 55 and 56. The bag-shaped holes 51*a* and 51*b* (one holding portion) hold the lock levers 55 and 56 to cover the outer bosses 55*a* and 56*a* (held portions) formed on the outer sides in the axial direction. Specifically, the hole diameters of the non-through holes of the bag-shaped holes 51*a* and 51*b* and the boss diameters of the outer bosses 55*a* and 56*a* of the lock levers 55 and 56 are formed to be substantially the same as each other. Such a configuration can accurately determine the positions of the lock levers 55 and 56 in the opening-and-closing cover 50. The appearance of the opening-and-closing cover 50 can be enhanced as compared with a case where the positional relations between the bag-shaped holes 51*a* and 51*b* and the through holes 52*a* and 53*a* (the metallic stays 52 and 53) in the axial direction are reversed. With reference to FIG. 8, the bag-shaped holes 51*a* and 51*b* are non-through holes formed in a recessed shape from an inner side in the axial direction not to penetrate to outer sides in the axial direction.

More specifically, in the lock lever 55 on the one end in the axial direction (left side in FIGS. 3 and 5) of the rotation shaft 54, the outer boss 55*a* protruding outward in the axial direction is fitted in and held by a non-through hole of the bag-shaped hole 51*a* on the one end in the axial direction, and the inner boss 55*b* protruding inward in the axial direction is fitted in and held by the through hole 52*a* of the metallic stay 52 on the one end in the axial direction. On the other hand, in the lock lever 56 on the other end in the axial direction (right side in FIGS. 3 and 5), the outer boss 56*a* protruding outward in the axial direction is fitted in and held by a non-through hole of the bag-shaped hole 51*b* on the other end in the axial direction, and the inner boss 56*b* protruding inward in the axial direction is fitted in and held by the through hole 53*a* of the metallic stay 53 on the other end in the axial direction. As described above, in the present embodiment, the pair of lock levers 55 and 56 and the pair of metal stays 52 and 53 are formed symmetrically in the axial direction.

As described above, in the opening-and-closing cover 50 according to the present embodiment, the lock levers 55 and 56 (and the rotation shaft 54) are held at both ends. Accordingly, a failure that the rotation shaft 54 is deformed is not likely to occur even if the opening-and-closing cover 50 receives a pressure from the body of the image forming apparatus 1 when the opening-and-closing cover 50 is closed. Accordingly, a failure in which an abnormality (operation failure) occurs in the opening-and-closing operation of the opening-and-closing cover 50 due to deformation of the rotation shaft 54 is also reduced. In particular, in the present embodiment, the maximum pressure per unit area that the secondary transfer roller 89 receives from the body of the image forming apparatus 1 when the opening-and-closing cover 50 is closed acts in the vicinities of the lock levers 55 and 56. Specifically, at least one of the secondary transfer roller 89 and the secondary-transfer backup roller 82 is pressed at axial ends of its shaft by biasing members such as compression springs via bearings. As illustrated in FIGS. 2A and 2B, the secondary transfer roller 89 is disposed in the vicinity of the rotation shaft 54 to extend in the axial direction. Such a configuration causes a large pressure (the pressure that is maximum in the pressure distribution in the axial direction) to act in the vicinities of the lock levers 55 and 56 disposed at the ends in the axial direction. Accordingly, the deformation of the rotation shaft 54 described above is likely to occur, and the configuration of the present embodiment is useful.

Figure 7A:
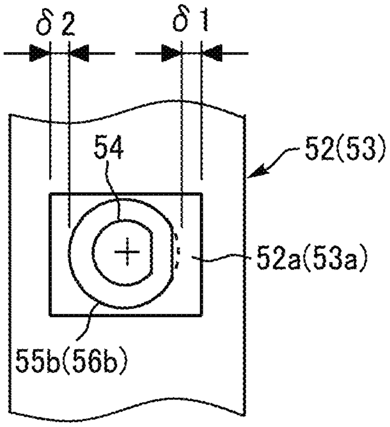
FIGS. 7A and 7B are cross-sectional views of a boss of the lock lever of FIGS. 6A and 6B and a hole portion of a metal stay according to an embodiment of the present disclosure.
Figure 7B:
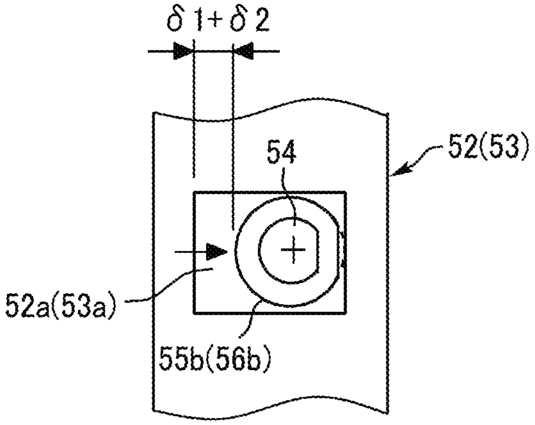

With reference to FIG. 7A, in the opening-and-closing cover 50 according to the present embodiment, the inner boss 55*b* (56*b*) as the held portion of the lock lever 55 (56) held by the through hole 52*a* (53*a*) is fitted in the through hole 52*a* (53*a*) of the metallic stay 52 (53) with slight clearance (δ1+δ2). Such a configuration can reduce the occurrence of abnormal noise (noise caused by rubbing of metal and resin) due to sliding of the lock lever 55 (56) made of a resin material in the through hole 52*a* (53*a*) of the metal stay 52 (53) when the lock lever 55 (56) rotates, as compared with a case where the inner boss 55*b* (56*b*) is fitted in the through hole 52*a* (53*a*) without any clearance. In the present embodiment, the through holes 52*a* and 53*a* of the metallic stays 52 and 53 have a substantially rectangular shape, and their longitudinal dimensions are set to be larger than the outer diameter of the inner bosses 55*b* and 56*b* by a specified dimension (δ1+δ2). The dimensions of the through holes 52*a* and 53*a* in the short direction are set to be substantially equal to the outer diameter of the inner bosses 55*b* and 56*b*. Even in such a case, the contact area between the through hole 52*a* and the inner boss 55*b* and the contact area between the through hole 53*a* and the inner boss 56*b* are reduced, and thus the above-described abnormal noise can be reduced. In the present embodiment, the longitudinal directions of the through holes 52*a* and 53*a* substantially coincide with the direction of a pressing force to be received from the body of the image forming apparatus 1 when the opening-and-closing cover 50 is closed. Accordingly, even if the rotation shaft 54 is deformed by the pressing force, the rotation shaft 54 can be released by the amount of the clearance (δ1+δ2) (and thus, the inconvenience in which the rotation shaft 54 contacts the through holes 52*a* and 53*a* with a strong force is reduced). As illustrated in FIG. 7B, in the present embodiment, when the opening-and-closing cover 50 is closed, the inner boss 55*b* (56*b*) moves together with the rotation shaft 54 in the direction indicated by the arrow (right side in FIG. 7B) by the biasing of the torsion spring 57 to be described below. Thus, the inner boss 55*b* (56*b*) contacts the inner face of the through hole 52*a* (53*a*). As a result, the position of the inner boss 55*b* (56*b*) in the through hole 52*a* (53*a*) is determined.

In the present embodiment, the lock levers 55 and 56 are disposed at both ends of the rotation shaft 54 in the axial direction. At least one of the two lock levers 55 and 56 is movable in the axial direction with respect to the rotation shaft 54. Specifically, with reference to FIGS. 8A to 8C, in the present embodiment, one lock lever 55 that is a lock lever on one end in the axial direction (left side in FIG. 8) is disposed to be slidable with respect to the rotation shaft 54 in the axial direction (left-and-right direction in FIG. 8). On the other hand, the other lock lever 56 that is the lock lever on the other end in the axial direction (right side in FIG. 8) is disposed so as not to be movable (fixedly disposed) in the axial direction with respect to the rotation shaft 54. In the present embodiment, a stop ring 70 (see FIGS. 3, 5, and 8C) serving as a positioner that determines the axial position of the one slidable lock lever 55 (at least one lock lever) on the rotation shaft 54 is finally disposed on the rotation shaft 54. Such a configuration facilitates the rotation shaft 54 with the lock levers 55 and 56 attached thereto to be assembled into the two bag-shaped holes 51*a* and 51*b*, which are disposed at the fixed positions in the cover body 51, and the two metallic stays 52 and 53 (the through holes 52*a* and 53*a*).

Figure 8A:
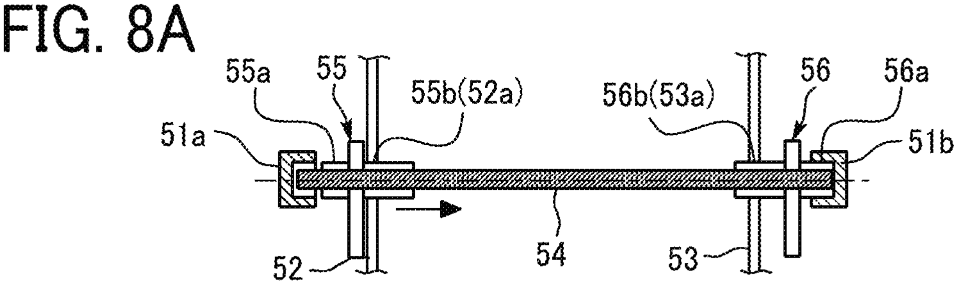
FIGS. 8A, 8B, and 8C are diagrams illustrating an operation of assembling a unit in which the lock lever of FIGS. 6A and 6B and a rotation shaft are sub-assembled to the opening-and-closing cover of FIGS. 2A and 2B, according to an embodiment of the present disclosure.
Figure 8B:
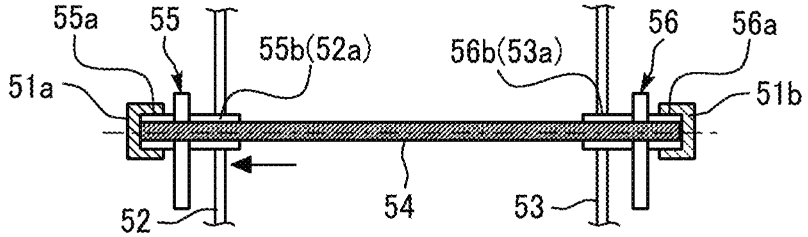
Figure 8C:
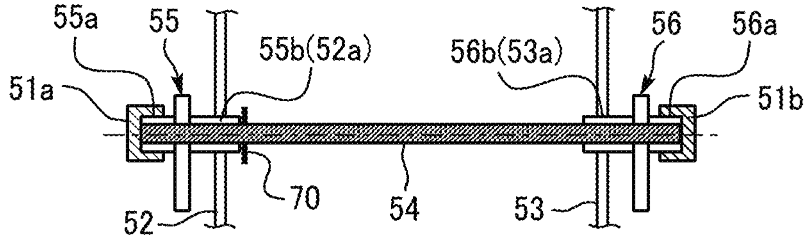

Specifically, as illustrated in FIG. 8A, the two bag-shaped holes 51*a* and 51*b* and the two metallic stays 52 and 53 are fixedly disposed in the opening-and-closing cover 50. One of the lock levers 55 is slid inward in the axial direction (in the direction indicated by the arrow in FIG. 8A) of the rotation shaft 54, and the rotation shaft 54 with the other lock lever 56 fixed thereon is set to the opening-and-closing cover 50 to be inserted in the two bag-shaped holes 51*a* and 51*b* and the two through holes 52*a* and 53*a* while the rotation shaft 54 is inclined with respect to the center axis illustrated by the long dashed short dashed line in FIG. 8A. At this time, the outer boss 55*a* of the one lock lever 55 is not held by the bag-shaped hole 51*a*. As illustrated in FIG. 8B, the lock lever 55, which has been slid and moved inward in the axial direction, is slid outward in the axial direction (in the direction indicated by the arrow in FIG. 8B, the left side), so that the outer boss 55*a* is held (fitted) in the bag-shaped hole 51*a*. As illustrated in FIG. 8C, the stop ring 70 is disposed on the rotation shaft 54 such that the slidable lock lever 55 is not slid in a state where both the lock levers 55 and 56 are held by the opening-and-closing cover 50. Thus, the setting of the rotation shaft 54 and the lock levers 55 and 56 to the opening-and-closing cover 50 is completed. In FIGS. 8A to 8C, the operation lever 58 and the torsion spring 57 are not illustrated for the sake of simplicity. However, the operation lever 58 and the torsion spring 57 are disposed (sub-assembled) on the rotation shaft 54 and the lock levers 55 and 56 before the operation lever 58 and the torsion spring 57 are set on the opening-and-closing cover 50.

As illustrated in FIGS. 3 and 5, in the present embodiment, the opening-and-closing cover 50 includes the torsion spring 57 serving as a biasing member that biases at least one lock lever (the lock lever 55 that is slidable on one end in the axial direction of the rotation shaft 54 in the present embodiment) in the direction to be locked by the locking pin 60 (locking portion). Specifically, the torsion spring 57 (biasing member) has a coil portion, one foot portion, and another foot portion. The coil portion is inserted in the inner boss 55*b* of the lock lever 55. The one foot portion is hooked on the metallic stay 52. The other foot portion is hooked on the lock lever 55. The torsion spring 57 biases the lock lever 55 in a direction opposite to the direction indicated by the arrow in FIG. 6B. As described above, the torsion spring 57 is disposed as illustrated in FIGS. 3 and 5, so that the operation lever 58 automatically returns to the state of FIG. 4A by the biasing of the torsion spring 57 when an operator releases the operation lever 58 in the state of FIG. 4B. The lock levers 55 and 56 in the unlocked state with respect to the locking pins 60 as illustrated in FIG. 6B return to the locked state as illustrated in FIG. 6A, and the locked state is maintained. As described above with reference to FIGS. 8A to 8C, since the one lock lever 55 is disposed to be slidable with respect to the rotation shaft 54, there is a slight clearance (rattling) between the rotation shaft 54 and the inner diameter portion of the lock lever 55. On the other hand, when the torsion spring 57 is disposed to the lock lever 55 having such a clearance with respect to the rotation shaft 54, the direction in which the clearance is generated can be limited to one direction. Such a configuration can reduce a failure that when the lock lever 55 rotates together with the rotation shaft 54, the posture of the lock lever 55 in the rotating direction with respect to the rotation shaft 54 is not fixed due to the clearance (rattling). In other words, the posture during rotation is stable. Since the other lock lever 56 is fitted to the rotation shaft 54 with almost no clearance, the above-described failure that occurs in the one lock lever 55 hardly occurs.

As described above, the image forming apparatus 1 according to the present embodiment includes the opening-and-closing cover 50. The opening-and-closing cover 50 is rotatable around the support shaft 50*a* relative to the body of the image forming apparatus 1 and receives a pressing force acting in the opening direction from the body of the image forming apparatus 1 when the opening-and-closing cover 50 is closed. The opening-and-closing cover 50 is provided with the rotation shaft 54 and the lock levers 55 and 56. The rotation shaft 54 is rotatably held. The lock levers 55 and 56 are rotatably disposed on the rotation shaft 54, and are locked or unlocked with respect to the locking pins 60 (locking portions) of the body of the image forming apparatus 1 in conjunction with the rotation of the rotation shaft 54. The opening-and-closing cover 50 has the bag-shaped hole 51*a* and the through hole 52*a* to sandwich the lock lever 55 from both sides in the axial direction of the rotation shaft 54. The opening-and-closing cover 50 has the bag-shaped hole 51*b* and the through hole 53*a* to sandwich the lock lever 56 from both sides in the axial direction. The bag-shaped hole 51*a* and the through hole 52*a* (a pair of holding portions) hold the outer boss 55*a* and the inner boss 55*b*. The bag-shaped hole 51*b* and the through hole 53*a* (a pair of holding portions) hold the outer boss 56*a* and the inner boss 56*b*. The outer boss 55*a* and the inner boss 55*b* are formed at both ends of the lock lever 55 in the axial direction. The outer boss 56*a* and the inner boss 56*b* are formed at both ends of the lock lever 56 in the axial direction. Such a configuration is less likely to cause a failure that the rotation shaft 54 that is held rotatable together with the lock levers 55 and 56 in the opening-and-closing cover 50 is deformed.

In the present embodiment, the present disclosure is applicable to the image forming apparatus 1 in which the opening-and-closing cover 50 provided with the two lock levers 55 and 56 (and the body of the image forming apparatus 1 provided with the two pairs of holding portions) is disposed. On the other hand, the present disclosure is also applicable to an image forming apparatus in which an opening-and-closing cover provided with one lock lever or three or more lock levers (and a body of an image forming apparatus provided with one pair or three or more pairs of holding portions) is disposed. In the present embodiment, the present disclosure is applicable to the color image forming apparatus 1. However, the present disclosure may be applicable to a monochrome image forming apparatus as well. In the present embodiment, the image forming apparatus 1 is an electrophotographic image forming apparatus. However, embodiments of the present disclosure are not limited to the electrophotographic image forming apparatus. In some embodiments, for example, the image forming apparatus may be an image forming apparatus of another system (for example, an image forming apparatus of an inkjet system or a stencil printer). The present disclosure is applicable to an image forming apparatus provided with an opening-and-closing cover that does not hold the secondary transfer roller 89 as long as the image forming apparatus receives a pressure from the body of the image forming apparatus when the opening-and-closing cover is closed. In the present embodiment, the present disclosure is applicable to the image forming apparatus 1 in which the opening-and-closing cover 50 provided with the double-sided conveyance passage K5 is disposed. However, the present disclosure is also applicable to an image forming apparatus in which an opening-and-closing cover without a two-sided conveyance path is disposed. Such cases can attain advantageous effects equivalent to the effects of the above-described embodiments.

The above-described embodiments and modifications are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components such as the number, the position, and the shape are not limited to the above-described embodiments, and thus may be set to any number, position, and shape suitable for an embodiment of the present disclosure.

Aspects of the present disclosure may be, for example, combinations of first to eleventh aspects as follows.

First Aspect

An image forming apparatus (e.g., the image forming apparatus 1) includes an opening-and-closing cover (e.g., the opening-and-closing cover 50) that is rotatable around a support shaft (e.g., the support shaft 50*a*) with respect to a body of the image forming apparatus and receives pressure in an opening direction from the body of the image forming apparatus when the opening-and-closing cover is closed. The opening-and-closing cover includes a rotation shaft (e.g., the rotation shaft 54), a lock lever (e.g., the lock levers 55 and 56), held portions (e.g., the outer bosses 55*a* and 56*a* and the inner bosses 55*b* and 56*b*), and a pair of holding portions (e.g., the bag-shaped holes 51*a* and 51*b* and the through holes 52*a* and 53*a*). The rotation shaft is rotatably held. The lock lever is rotatably disposed on the rotation shaft and is locked to or unlocked from a locking portion (e.g., the locking pin 60) of the body of the image forming apparatus in conjunction with rotation of the rotation shaft. The held portions are disposed to sandwich the lock lever from both sides of the rotation shaft in an axial direction of the rotation shaft and are formed at both ends of the lock lever in the axial direction. The pair of holding portions hold the held portions.

Second Aspect

In the image forming apparatus (e.g., the image forming apparatus 1) according to the first aspect, the opening-and-closing cover (e.g., the opening-and-closing cover 50) includes a cover body (e.g., the cover body 51) and a metal stay (e.g., the metal stay 52, 53) disposed in the cover body. One holding portion of the pair of holding portions (the bag-shaped holes 51*a* and 51*b* and the through holes 52*a* and 53*a*) is integrally formed with the cover body, and the other holding portion of the pair of holding portions is a through hole (e.g., the through hole 52*a*, 53*a*) formed in the metal stay.

Third Aspect

In the image forming apparatus (e.g., the image forming apparatus 1) according to the second aspect, the metal stay (e.g., the metal stay 52, 53) is disposed at each of ends of the cover body (e.g., the cover body 51) in the axial direction of the rotation shaft (e.g., the rotation shaft 54). The one of the pair of holding portions (e.g., the bag-shaped holes 51*a* and 51*b* and the through holes 52*a* and 53*a*) is disposed outside of the through hole as the other holding portion of the pair of holding portions in the axial direction via the lock lever (e.g., the lock lever 55, 56), and is a bag-shaped hole (e.g., the bag-shaped hole 51*a*, 51*b*) to hold to cover the held portions (e.g., the outer bosses 55*a* and 56*a* and the inner bosses 55*b* and 56*b*) formed outside of the lock lever.

Fourth Aspect

In the image forming apparatus (e.g., the image forming apparatus 1) according to the second or third aspect, the held portions (e.g., the outer bosses 55*a* and 56*a* and the inner bosses 55*b* and 56*b*) of the lock lever (e.g., the lock lever 55, 56) held in the through hole (e.g., the through hole 52*a*, 53*a*) is fitted in the through hole of the metal stay (e.g., the metal stay 52, 53) with a clearance.

Fifth Aspect

In the image forming apparatus (e.g., the image forming apparatus 1) according to any one of the first to fourth aspects, the metal stay (e.g., the metal stay 52, 53) is disposed at each of ends of the cover body (e.g., the cover body 51) in the axial direction of the rotation shaft (e.g., the rotation shaft 54). The lock lever (e.g., the lock lever 55, 56) is disposed at each of ends of the rotation shaft (e.g., the rotation shaft 54) in the axial direction. At least one of the two lock levers is movable with respect to the rotation shaft in the axial direction.

Sixth Aspect

The image forming apparatus (e.g., the image forming apparatus 1) according to the fifth aspect, the opening-and-closing cover (e.g., the opening-and-closing cover 50) includes a biasing member (e.g., the torsion spring 57) that biases at least one of the lock levers (e.g., the lock lever 55, 56) in a direction to be locked by the locking portion (e.g., the locking pin 60).

Seventh Aspect

In the image forming apparatus (e.g., the image forming apparatus 1) according to the fifth or sixth aspect, the other of the lock levers (e.g., the lock lever 55, 56) is not movable with respect to the rotation shaft (e.g., the rotation shaft 54) in the axial direction.

Eighth Aspect

In the image forming apparatus (e.g., the image forming apparatus 1) according to any one of the fifth to seventh aspects, the opening-and-closing cover (e.g., the opening-and-closing cover 50) includes an operation lever (e.g., the operation lever 58) that is rotatable together with the rotation shaft (e.g., the rotation shaft 54) and the lock lever (e.g., the lock lever 55, 56) and that can be operated by an operator.

Ninth Aspect

In the image forming apparatus (e.g., the image forming apparatus 1) according to any one of the fifth to eighth aspects, a positioner (e.g., the stop ring 70) that determines an axial position of the rotation shaft of at least one lock lever of the lock levers (e.g., the lock lever 55, 56) is disposed on the rotation shaft (e.g., the rotation shaft 54).

Tenth Aspect

In the image forming apparatus (e.g., the image forming apparatus 1) according to any one of the first to nineth aspects, a maximum pressure per unit area of the pressure that the image forming apparatus receives from the body of the image forming apparatus when the opening-and-closing cover (e.g., the opening-and-closing cover 50) is closed acts vicinity of the lock lever (e.g., the lock lever 55, 56).

Eleventh Aspect

In the image forming apparatus (e.g., the image forming apparatus 1) according to any one of the first to tenth aspects, the opening-and-closing cover (e.g., the opening-and-closing cover 50) rotatably holds a secondary transfer roller (e.g., the secondary transfer roller 89) for secondarily transferring a toner image formed on an intermediate transferor (e.g., the intermediate transfer belt 78) onto a sheet (e.g., the sheet P). The pressure is a pressure that the secondary transfer roller (e.g., the secondary transfer roller 89) receives from the body of the image forming apparatus when the opening-and-closing cover is closed.

Twelfth Aspect

In the image forming apparatus (e.g., the image forming apparatus 1) according to any one of the first to eleventh aspects, the held portion (e.g., the outer bosses 55*a* and 56*a* and the inner bosses 55*b* and 56*b*) is a boss (e.g., the outer boss 55*a*, the inner boss 55*b*) formed at each of both ends of the lock lever (e.g., the lock lever 55, 56) in the axial direction of the rotation shaft (e.g., the rotation shaft 54).

Thirteenth Aspect

In the image forming apparatus (e.g., the image forming apparatus 1) according to the fourth aspect, one of the held portions (e.g., the outer bosses 55*a* and 56*a* and the inner bosses 55*b* and 56*b*) contacts an inner wall of the through hole (e.g., the through hole 52*a*, 53*a*) of the metal stay (e.g., the metal stay 52, 53) when the opening-and-closing cover (e.g., the opening-and-closing cover 50) is closed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

an opening-and-closing cover that is rotatable around a support shaft with respect to a body of the image forming apparatus, the opening-and-closing cover configured to receive pressure in an opening direction from the body of the image forming apparatus when the opening-and-closing cover is closed, the opening-and-closing cover including a rotation shaft rotatably held;

a first lock lever rotatably disposed on the rotation shaft, the first lock lever configured to be locked to or unlocked from a locking portion of the body of the image forming apparatus in conjunction with rotation of the rotation shaft, the first lock lever including a pair of held portions at both ends of the first lock lever in an axial direction of the rotation shaft;

a pair of holding portions disposed to sandwich the first lock lever from both sides of the first lock lever in the axial direction of the rotation shaft and hold the pair of held portions;

a cover body; and a first metal stay disposed in the cover body, wherein one holding portion of the pair of holding portions is united with the cover body, and wherein another holding portion of the pair of holding portions is a through hole of the first metal stay.

2. The image forming apparatus according to claim 1, further comprising a second metal stay, the first metal stay and the second metal stay being respectively disposed at first and second opposite ends of the cover body in the axial direction of the rotation shaft, wherein the one holding portion is disposed at a position outward from the through hole via the first lock lever in the axial direction of the rotation shaft, and wherein the one holding portion is a bag-shaped hole configured to hold and cover one held portion of the pair of held portions, the one held portion disposed at a position outward from another held portion of the pair of held portions in the axial direction of the rotation shaft.

3. The image forming apparatus according to claim 1, wherein one of the pair of held portions of the first lock lever held in the through hole is fitted in the through hole of the first metal stay with a clearance between the one of the pair of held portions and the first metal stay.

4. The image forming apparatus according to claim 3, wherein the one of the pair of held portions contacts an inner wall of the through hole of the first metal stay when the opening-and-closing cover is closed.

5. The image forming apparatus according to claim 1, further comprising:

a second metal stay, the first metal stay and the second metal stay being respectively disposed at first and second ends of the cover body in the axial direction of the rotation shaft; and a second lock lever, the first lock lever and the second lock lever being respectively disposed at first and second ends of the rotation shaft in the axial direction, and wherein at least one of the first lock lever and the second lock lever is movable in the axial direction with respect to the rotation shaft.

6. The image forming apparatus according to claim 5, wherein one of the first lock lever and the second lock lever is unmovable with respect to the rotation shaft in the axial direction.

7. The image forming apparatus according to claim 6, wherein the opening-and-closing cover includes an operation lever that is rotatable together with the rotation shaft and the first lock lever and the second lock lever, and that is operable by an operator of the image forming apparatus.

8. The image forming apparatus according to claim 1, wherein the opening-and-closing cover includes a biasing member that biases the first lock lever in a direction in which the first lock lever is locked to the locking portion.

9. The image forming apparatus according to claim 5, further comprising a positioner disposed on the rotation shaft, the positioner configured to determine a position of the at least one of the first lock lever and the second lock lever in the axial direction of the rotation shaft.

10. The image forming apparatus according to claim 5, wherein a maximum pressure per unit area of the pressure that the opening-and-closing cover receives from the body of the image forming apparatus when the opening-and-closing cover is closed acts on a vicinity of the at least one of the first lock lever and the second lock lever.

11. The image forming apparatus according to claim 1, wherein the opening-and-closing cover rotatably holds a secondary transfer roller configured to secondarily transfer a toner image formed on an intermediate transferor onto a sheet, and wherein the pressure is a pressure that the secondary transfer roller receives from the body of the image forming apparatus when the opening-and-closing cover is closed.

12. The image forming apparatus according to claim 1, wherein the pair of held portions are a pair of bosses at the both ends of the first lock lever in the axial direction of the rotation shaft.

* * * * *